(12) United States Patent
Taubman (10) Patent No.: US 8,176,437 B1
(45) Date of Patent: May 8, 2012

(54) RESPONSIVENESS FOR APPLICATION LAUNCH

(75) Inventor: Gabriel Taubman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/184,710

(22) Filed: Jul. 18, 2011

(51) Int. Cl.
*G06F 3/048* (2006.01)
(52) U.S. Cl. ......... 715/810; 715/765; 715/757; 715/854
(58) Field of Classification Search .................. 715/810, 715/765, 757, 854
See application file for complete search history.

(56) References Cited

U.S. PATENT DOCUMENTS

| | | | |
|---|---|---|---|
| 5,212,821 A | 5/1993 | Gorin et al. | |
| 5,530,865 A | 6/1996 | Owens et al. | |
| 5,974,413 A | 10/1999 | Beauregard et al. | |
| 6,243,755 B1 | 6/2001 | Takagi et al. | |
| 7,076,616 B2 | 7/2006 | Nguyen et al. | |
| 7,219,302 B1 | 5/2007 | O'Shaughnessy et al. | |
| 7,412,234 B2 | 8/2008 | Zellner | |
| 7,486,930 B2 | 2/2009 | Bisdikian et al. | |
| 7,565,340 B2 | 7/2009 | Herlocker et al. | |
| 7,698,513 B2 | 4/2010 | Sechrest et al. | |
| 7,797,338 B2 | 9/2010 | Feng et al. | |
| 7,827,495 B2 | 11/2010 | Bells et al. | |
| 7,895,261 B2 | 2/2011 | Jones et al. | |
| 7,907,122 B2 | 3/2011 | LaPointe et al. | |
| 2003/0013483 A1 | 1/2003 | Ausems et al. | |
| 2004/0030882 A1 | 2/2004 | Forman | |
| 2005/0091184 A1 | 4/2005 | Seshadri et al. | |
| 2007/0157106 A1 | 7/2007 | Bishop | |
| 2008/0010534 A1 | 1/2008 | Athale et al. | |
| 2008/0115069 A1 | 5/2008 | Veselova | |
| 2008/0141149 A1 | 6/2008 | Yee et al. | |
| 2008/0275764 A1 | 11/2008 | Wilson et al. | |
| 2009/0055739 A1 | 2/2009 | Murillo et al. | |
| 2009/0204928 A1 | 8/2009 | Laehdesmaeki et al. | |
| 2009/0293000 A1 | 11/2009 | Lepeska | |
| 2009/0300657 A1 | 12/2009 | Kumari | |
| 2010/0017872 A1 | 1/2010 | Goertz et al. | |
| 2010/0146441 A1 | 6/2010 | Halme | |

(Continued)

FOREIGN PATENT DOCUMENTS

EP 2088501 8/2009

OTHER PUBLICATIONS

Kevin Juang, "Use of Eye Movement Gestures for Web Browsing," 2005.*

(Continued)

*Primary Examiner* — William Bashore
*Assistant Examiner* — Daniel Um
(74) *Attorney, Agent, or Firm* — McDonnell Boehnen Hulbert & Berghoff LLP (57) ABSTRACT

The technology generally relates to predictively launching applications and powering up devices. Embodiments may include a computer-implemented method that maintains a plurality of individual folders. The individual folders may include one or more applications. A command may be used to open a selected folder. In response to receiving the command, embodiments may predict which application in the selected folder will be selected for launching and load program code associated with the predicted application into active memory. A command to launch a selected application included in the selected folder is received and, in response, the selected application is launched.

18 Claims, 6 Drawing Sheets

U.S. PATENT DOCUMENTS

| | | |
|---|---|---|
| 2010/0149073 A1 | 6/2010 | Chaum |
| 2010/0217657 A1 | 8/2010 | Gazdzinski |
| 2011/0010672 A1 | 1/2011 | Hope |
| 2011/0072492 A1 | 3/2011 | Mohler et al. |
| 2011/0107227 A1 | 5/2011 | Rempell et al. |
| 2011/0191316 A1 | 8/2011 | Lai et al. |

OTHER PUBLICATIONS

Android Muzikant, "Automatelt goes Pro !" May 2011.*
Kevin Purdy, "Install Speech Macros in Vista," Jul. 2008.*
"Preload—An Adaptive Prefetching Daemon" by Esfahbod, Behdad, Graduate Department of Computer Science, University of Toronto, 2006, Retrieved from the Internet: http://www.techthrob.com/tech/preload_files/preload.pdf.
"FAST: Quick Application Launch on Solid-State Drives" by Yongsoo Joo, Junhee Ryu, Sangsoo Park, and Kang G. Shin, Proceeding FAST'11 Proceedings of the 9th USENIX conference on File and stroage technologies, 2011, Retrieved from the Internet: http://www.usenix.org/events/fast/tech/full_papers/Joo.pdf.
http://www.addictivetips.com/mobile/trigger-actions-on-your-android-device-automatically/.
Cakmakci, O., et al., "Head-Worn Displays: A Review," Journal of Display Technology, vol. 2, pp. 199-216, 2006.

* cited by examiner

RESPONSIVENESS FOR APPLICATION LAUNCH

BACKGROUND

The Internet has provided users with access to an overwhelming number of applications that may accomplish anything from the most mundane to the most complex of tasks. With so many applications to choose from, however, users may be inundated with choices and may find themselves spending an unwarranted amount of time searching for applications. It is important to minimize the amount of time users must spend searching for applications. Folders offer one convenient tool for keeping similar applications together.

Even with folders or other organizational structures in place, users must wait multiple seconds if not minutes for all of the program code associated with a desired application or the application's hardware to load. In an age when time is money, the amount of time it takes to load an application may become burdensome, especially when multiple software functions or hardware devices are needed for a single application. Accordingly, it becomes important to minimize the amount of time users must wait for their applications and associated hardware and/or software to load and become functional.

SUMMARY

An embodiment may include a computer-implemented method that maintains a plurality of individual folders. The individual folders may include one or more applications. A command is used to open a selected folder. In response to receiving the command, a prediction may be made as to which application in the selected folder will be selected for launching, and the program code associated with the predicted application may be loaded into active memory. In some embodiments, hardware associated with the predicted application may additionally or alternatively be initialized in response to receiving the command to open the selected folder. A command to launch a selected application included in the selected folder may be received and, in response, the selected application may be launched.

Another embodiment may include a computer device having a display device, which displays a graphical user interface. The graphical user interface may include a plurality of folders having one or more applications. The computer device may further include a non-transitory computer-readable media having active memory configured to store program code associated with one or more active applications. Also included may be a storage memory configured to store program code associated with one or more inactive applications. The computing device may include a user interface that is configured to receive a command to open a folder of the plurality of folders and a prediction module that is configured to predict which application included in the selected folder will be selected for launching. The prediction module may also be configured to initiate the transfer of program code associated with the predicted application from the storage memory to the active memory in response to receiving the command to open the selected folder.

DETAILED DESCRIPTION OF THE FIGURES

One embodiment relates to predictively launching applications and powering up devices. More specifically, one embodiment contemplates an environment where a user has multiple applications on a device or display screen. The applications may be arranged into folders, either by the user, computing device, or application provider. For example, an application for determining what music is playing in the background may be located in a "music" folder, whereas an application for taking or editing photographs may be located in a "photos" folder.

One embodiment may utilize a computing device. The computing device may receive one or more inputs from various types of sensors, I/O devices, or the like. Exemplary inputs may include location data obtained from a global positioning system (GPS), voice data obtained from a microphone, or historical user data, such as what application was most recently selected in the folder. The computing device may be configured to receive, record, or analyze inputs from these components when a user selects a folder. Thus, for example, when a user selects a "music" folder, a microphone may be used to obtain data, such as chords of a song playing in the background, and send the data to the computing device as an input.

The computing device may include a number of modules, one of which is a prediction module. The prediction module may be hardware, software, or any combination of hardware and software. The prediction module may receive inputs and use the inputs to predict what application in the folder the user is likely to select. Once a predicted application is ascertained, program code associated with the application's software and/or hardware may be loaded into active memory. For example, the prediction module may determine that the background chord data was in fact a song playing in the background. Likewise, the prediction module may determine that, based on a GPS input, the user is at a concert venue. Additional information, such as the user's frequent selection of a song identification application within the "music" folder may also be an input to the prediction module. After receiving one or more inputs, the prediction module may predict what application in the folder the user is likely to select. This is the predicted application.

The prediction module may then load program code associated with the predicted application's software and/or hardware into active memory in anticipation of the predicted application being selected. For example, if the predicted application is a song identification application, the prediction module or launching module may begin loading music recognition software program code that will be needed for running the song identification application. As another example, if the predicted application is a photo application, the prediction module or launching module may begin loading camera hardware and software program code so the camera will be ready should the user select the predicted photo application. This beneficially saves the user time because the software and/or hardware program code that is required to run the predicted application, or components related to the predicted application, may be loaded into memory so that the predicted application can be launched quickly if the predicted application is the selected application.

The computing device may also include a launching module. The launching module may receive a command that indicates what application the user has selected from within the folder and inform the launching module to launch program code associated with the selected application's software and/or hardware.

1. Exemplary Embodiments

Figure 1:
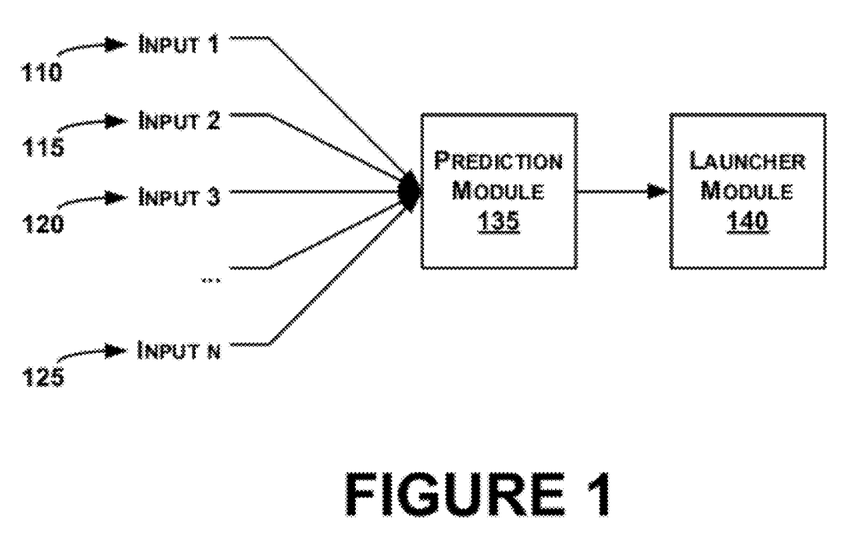
FIG. 1 illustrates a high level data flow diagram in accordance with one embodiment.

FIG. 1 illustrates aspects of the prediction module 135 according to some embodiments. The prediction module 135 is configured to accept one or more inputs 110, 115, 120, and 125. Typically, the inputs 110, 115, 120, and 125 are retrieved by the prediction module 135 in response to a folder being selected by a user, administrator, algorithm, remote device, etc. However, in embodiments, the prediction module 135 may retrieve one or more inputs 110, 115, 120, and 125 at predetermined time intervals, upon the happening of predefined or ad-hoc events, or similar type instances. This allows the prediction module to pull inputs in a continuous or non-continuous manner. Embodiments may also allow one or more inputs 110, 115, 120, and 125 to be sent to the prediction module 135, for example, by a user, administrator, etc. Thus, a user may send a user identifier, preference indicator, location indicator, etc., to the prediction module 135 indicating, for example, which user is selecting the folder and whether the user is indoors or outdoors.

The source of the inputs 110, 115, 120, and 125 may vary based on the type of input 110, 115, 120, and 125 that is being sent to the prediction module 135. Exemplary input sources include sensors and I/O devices. As described in more detail below, exemplary sensors may include Global Positioning System (GPS) receivers, biometric sensors, infrared sensors, optical sensors, biosensors, Radio Frequency identification (RFID) systems, wireless sensors, smoke sensors, radio sensors, microphones, speakers, gyroscopes, accelerometers, cameras, radars, capacitive sensors, touch sensors, compasses, etc. Exemplary I/O devices may include keyboards, displays, pointing devices, microphones, headsets, etc. Additional input sources may include internal clocks, databases, program functions, etc.

For example, input 110 may be GPS data obtained from a sensor and relating to the location of the user when a folder is selected. In embodiments, input 115 may be biometric data such as, for example, an iris scan that may be used to identify the user selecting a folder. Input 120 may be, for example, data analytics such as the frequency in which a first application in the selected folder is selected over a second, third, or fourth application in the selected folder. Additional analytics may include, for example, what a user typically does when entering a given folder, what resources the applications in the folder use, etc.

Inputs 110, 115, 120, and 125 may also include data or analysis on the history of the applications in the selected folder. For example, the inputs 110, 115, 120, and 125 may indicate that an application within the folder has been selected to be launched a certain number or percentage of times in the past. In embodiments, this history may be of applications that have been launched within a predefined time period. This predetermined time may be measured, for example, at the time the command to open the selected folder was sent, received, or executed. The history may also include what applications, if any, are currently running and what applications may have been recently run.

Inputs may be temporal in nature. For example, inputs may relate to the date and time that the command to open the selected folder was received. The date and time input may be based on an internal clock and be attuned to the user's time zone or a pre-determined time zone.

Embodiments may allow location data as an input 110, 115, 120, and 125. Location data may be obtained, for example, from GPS sensors. As with other embodiments, the location data may be obtained when the command to open the selected folder is sent, received, or executed. The location data may represent the user's location or the location of a friend or colleague who has opted to share his or her location data. In embodiments, the location of stores, museums, government buildings, etc., may be obtained using GPS sensors or the like.

For example, GPS sensor data may be used to determine that, for example, the user selecting the "music" folder is at work instead of at home. This data can be received by the prediction module 135 as an input 110. The prediction module 135 may use this input 110 alone or in combination with other inputs 115, 120, and 125 to predict what application the user is likely to choose from within the "music" folder. Thus, for example, the prediction module 135 may know from historical data that the user typically uses a music streaming application when at work and a music synthesizer application when at home. This allows the prediction module 135 to more accurately predict what application the user is likely to select from within the selected folder.

Geographic data, including environmental data, may be received by the prediction module 135. Geographic data may be obtained using any number of geographic sensors. For example, geographic sensors may be used to obtain data on the local physical terrain surrounding a user at the time the command to open the selected folder is sent, received, or executed. Characteristics of nearby physical objects or buildings, such as how tall a building is, how many cars are on the road, how far the nearest subway station is from the user, etc., may also be obtained using geographic sensors. In embodiments, GPS sensors may be used to obtain geographic data instead of or in addition to geographic sensors.

In embodiments, geographic data may be used to determine, for example, if a user is surrounded by a number of tall buildings or near a national park. This geographic data may be sent to the prediction module 135 as an input 115. The prediction module 135 may use this input 115 alone or in combination with other inputs 110, 120, and 125 to predict what application the user is likely to choose from within the "GPS" folder. For example, if the user is near a national park, the prediction module 135 may predict that the user will select a campsite locator application. If the user is near a number of tall buildings, however, the prediction module may predict that the user will select a restaurant locator application instead of a campsite locator application. In this way, the prediction module 135 may more accurately predict what application the user is likely to select from within the selected folder.

Inputs 110, 115, 120, and 125 to the prediction module 135 may be received from light sensors when the command to open the selected folder is sent, received, or executed. Numerous light sensors are known. Exemplary light sensors may broadly include, for example, optic detectors, photosensors, photodiodes, fiber optics, and electro-optical or photoelectric sensors. In embodiments, light sensors may be used to determine ambient light, if there is overhead cloud coverage, or if the user is indoors. Light sensors may also obtain data from a predetermined period of time prior to the user selecting a folder.

For example, the prediction module 135 may receive light sensor data at input 120. The prediction module 135 may use this input 120 alone or in combination with other inputs 110, 115, and 125 to predict what application the user is likely to choose from within the "photos" folder. The prediction module may use the light sensor input 120 in conjunction with time of day and/or GPS location inputs to determine, for example, that it is uncharacteristically dark where the user is located. Based on this information, the prediction module 135 may predict that the user will select a camera flash application that would allow the user to take photographs in the dark location. Software and/or hardware program code associated with the predicted application may then be loaded.

The prediction module 135 may receive audio inputs from sensors such as microphones. This audio data may be received when the command to open the selected folder is sent, received, or executed. In embodiments, the audio data may also be obtained during a predetermined period of time prior to the user selecting a folder. For example, a microphone may be used to receive a voice command to open a folder. The voice command may be received by the prediction module 135 and a determination made as to the identity of the user. This may aid the prediction module 135 when analyzing user histories such as what application the user most frequently selects from within a folder. Characteristics about the user's surroundings, such as if there is music playing in the background or if there is another person with the user, etc., may also be obtained using audio sensors.

The prediction module 135 may also receive inputs 110, 115, 120, and 125 from an accelerometer or similar device. An accelerometer may be used for a variety of purposes such as determining what way a device is being held, for example, in portrait or landscape mode, determining if a user has tapped or otherwise interacted with the user interface, and even determining if a computing device is tilted. Additional uses for accelerometers include measuring how fast an object is accelerating, wind gusts, seismic activity, and a user's physical activities including how fast and how far the user has walked, run, or even swam. This data may be used, for example, to calculate the amount of energy the user or object has consumed. In embodiments, data from an accelerometer may be obtained in conjunction with data from gyroscopes, tilt sensors, or the like.

As an example, the prediction module 135 may receive input 125, alone or in combination with other inputs 110, 115, and 120, indicating that the user is holding a computing device facing the ground. The prediction module 135 may use this data to predict what application the user is likely to choose from within the "photos" folder. Thus, the prediction module 135 may know that the user frequently selects a photo editing application when the computing device is facing the ground and that the user frequently selects a camera zoom application when the computing device is facing perpendicular to the ground. This allows the prediction module 135 to predict that the user will select a photo editing application and load the associated software and/or hardware program code into memory.

Exemplary inputs may also include biometric sensor data. As with other inputs, biometric sensor data may be received during a predetermined period of time prior to or at the time that a command to open the selected folder is sent, received, or executed. Biometric sensors may be used to measure or otherwise obtain physiological, behavioral, and/or cognitive biometrics. Exemplary physiological biometrics include fingerprint, DNA, facial recognition, retina and/or iris data. This physiological data may be used to measure a user's pulse, temperature, eye movement, etc. Behavioral biometrics may include, for example, speech patterns, keystroke analytics, how a user opens a folder, etc. Cognitive biometrics, on the other hand, generally relate to what a user is thinking, learning, perceiving, judging, or aware of. For example, a user that quickly selects a folder may be in a rush. A user that forcibly taps or otherwise selects a folder on a touch screen may be angry or agitated.

Biometric sensor data allows the prediction module 135 to, for example, determine the identity of the user that selected the folder. This allows the prediction module to obtain historical inputs on what applications the user frequently selects. Biometric sensors may also indicate that, for example, the user has a high temperature and low pulse. When a user selects a "reference" folder, the prediction engine may receive this biometric input and predict that the user is looking for a medical diagnosis application. Software and/or hardware program code associated with the predicted application may then be loaded.

While exemplary inputs 110, 115, and 120 have been described, it should be understood that any number of inputs 110, 115, 120, and 125 may be sent to the prediction module 135. Thus, embodiments may include multiple inputs 110, 115, 120, and 125 from the same sensor, such as a biosensor, where the first input 110 may be, for example, photometric data and the second input 115 may be, for example, electrochemical data. These inputs 110 and 115 may be received simultaneously or individually at different time intervals. Embodiments also exist where no inputs are sent to the prediction module 135, for example, when there is only one application in the selected folder.

The prediction module 135 is designed to receive one or more inputs 110, 115, 120, and 125 and to predict what application(s) will be selected from within the selected folder. The process of predicting an application may vary between embodiments. For example, in embodiments, weights or values may be assigned to one or more of the inputs. The weight may vary depending on what folder was selected, the number and/or type of applications in the folder, the accuracy of the sensors or computational inputs, the user, etc. Additional and/or alternative algorithms may also be applied to predict what application will be selected.

Once the prediction module 135 predicts what application(s) are likely to be selected, either the prediction module 135 or another processor may determine what software and/or hardware device(s) are required or recommended for the predicted application and load the appropriate software and/or hardware program code into memory. Once an application is actually selected from within the selected folder, a command is sent to the launcher module 140 instructing the launcher module 140 to launch, i.e., power on or otherwise prepare the selected application for use.

The results from the prediction module 135 may lead to one or more software and/or hardware launches. For example, if a selected application uses voice recognition software, a command to launch voice recognition software may be sent to the launcher module 140. If a predicted application also uses GPS related hardware, a command to launch program code associated with the GPS hardware may be sent to the launcher module 140. The software and hardware program code may be launched separately or in conjunction with one another.

It should be understood that the described embodiments contemplate loading software and/or hardware program code prior to the actual selection of any application. In embodiments, the software and/or hardware program code may be completely or partially loaded prior to the actual selection of an application.

Figure 2:
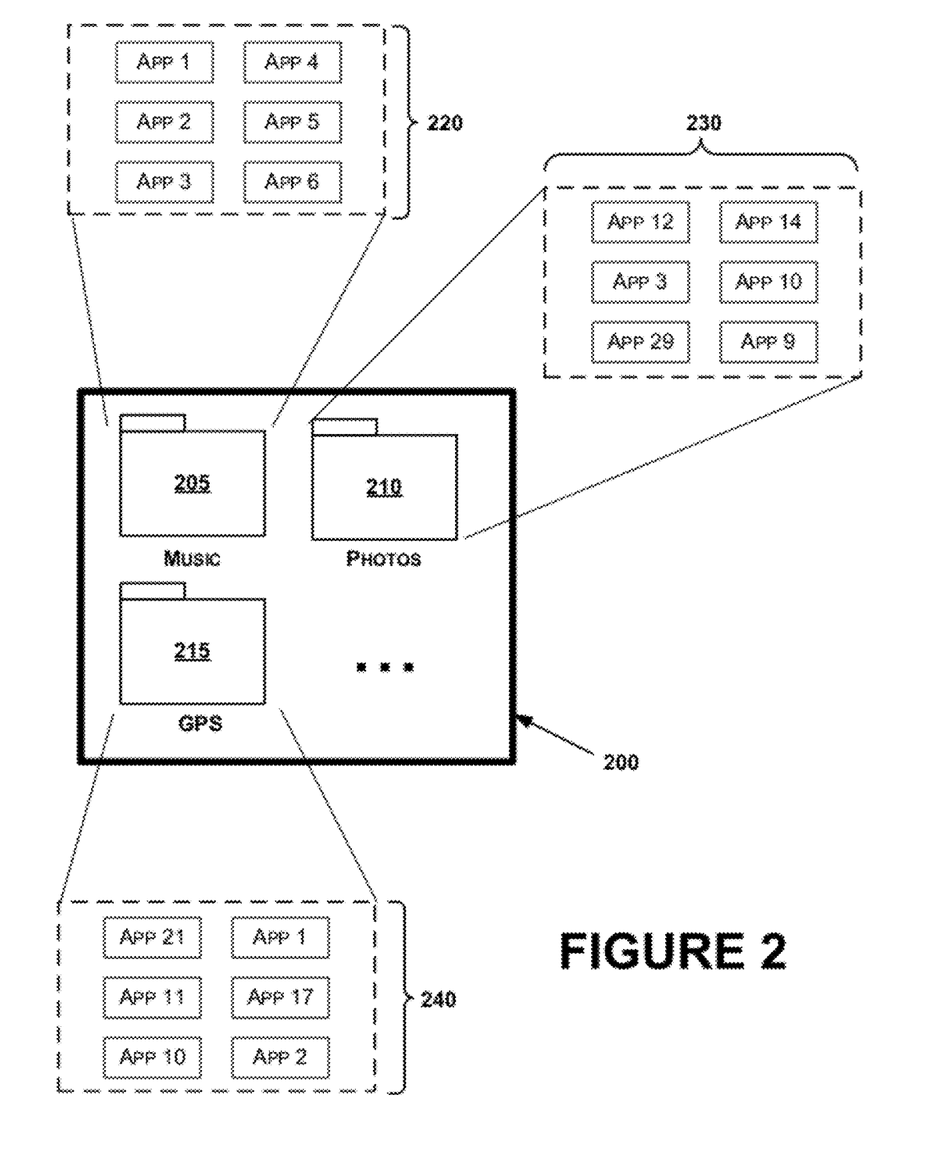
FIG. 2 illustrates a display having a number of folders and applications in accordance with one embodiment.

FIG. 2 shows an example of a display 200 having multiple folders 205, 210, and 215. The display 200 may be any visual display, such as a home screen. Moreover, in embodiments, the display 200 may be represented in whole or in part by audio. In these embodiments, the names of the folders may be read to a user via, for example, a voice synthesizer. The user may then enter a manual command associated with a folder or vocally indicate the selected folder, for example, by saying the folder's name. Speech recognition and voice recognition may be used to determine what folder was selected and who selected the folder, respectively.

Each folder 205, 210, and 215 may have one or more associated applications 220, 230, and 240. It should be understood that a folder may be any electronic construct that is capable of including one or more applications. In embodiments, an application may appear in zero, one, or more folders. For example, an application that allows a user to take a photo and associate that photo with a specific geographic location may be present in both a "photos" folder 210 and a "GPS" folder 215. Similarly, an application that allows a user to take a picture of a music label and obtain additional information about a band may be present in both a "photos" folder 210 and a "music" folder 205. In embodiments, a link or other shortcut to an application may be located within one or more of the folders 205, 210, and 215.

In embodiments, there may be an unlimited number of applications 220, 230, and 240 in a folder 205, 210, and 215. Optionally, a limit on the number of applications that may be placed in a folder may be imposed, for example, to reduce computational requirements when predicting which application 220, 230, and 240 is going to be selected. The separation of applications 220, 230, and 240 into folders 205, 210, and 215 may be performed by a user, by the computing device, be pre-defined by the application itself, etc.

Figure 3:
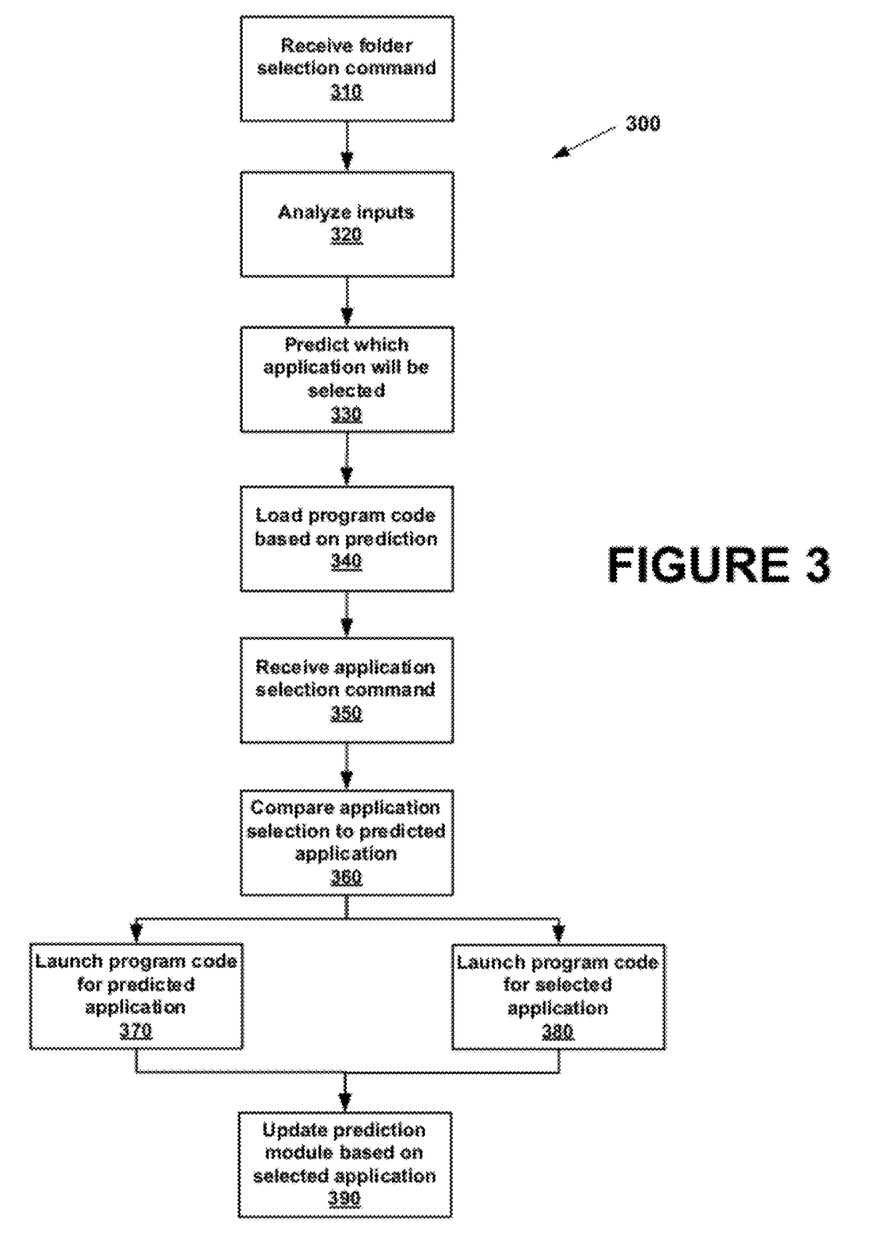
FIG. 3 is a block diagram of an exemplary method according one embodiment.

FIG. 3 is a block diagram of an exemplary method for predicting and loading one or more applications responsive to a folder being selected. Method 300 presents an embodiment of a method that, for example, could be used with computer infrastructure 420, system 536, or the like, and may be performed by one or more devices, such as computing devices 30 or 538 (illustrated below in FIGS. 4 and 5, respectively), or components of the device. The various blocks of method 300 may be combined into fewer blocks, divided into additional blocks, and/or removed based upon the desired implementation. In addition, each block may represent a module, a segment, or a portion of program code, which may include one or more instructions executable by a processor for implementing specific logical functions or steps in the process. The program code may be stored on any type of computer readable medium, for example, such as a non-transitory storage device including a disk or hard drive.

At step 310, the computing device may receive a folder selection command from a user, administrator, algorithm, remote device or the like requesting that a folder be opened. The command may be in the form of, for example, a mouse click, voice command, visual cue, etc. The command may be processed by a processor and sent to the prediction module 135. In embodiments, the prediction module 135 may have a separate processor that is capable of directly processing the selection command.

At step 320, the prediction module 135 may analyze inputs, such as inputs 110, 115, 120, and 125. In embodiments, the prediction module 135 may assign different weights or preferences to one or more of the inputs. These weights or preferences may be static or vary, for example, based on the total number of inputs, the types of inputs, and what folder the user selected.

The prediction module 135 may predict what application will be selected at step 330. The prediction may be based in whole or in part on the inputs that were analyzed in step 320. In embodiments, all of the applications in the folder may be ranked according to the likelihood of being selected. Alternatively, a subset of the applications that are most likely to be selected may be ranked according to their likelihood of being selected. The application that is the most likely to be selected in the selected folder may become the predicted application. While a single predicted application may be common, embodiments may have multiple predicted applications. This may occur, for example, when multiple applications have an equal or near equal likelihood of being selected. Additionally, this may occur when one or more of the most likely applications share common software or hardware program code.

At step 340, program code associated with the predicted application from step 330 may be loaded. Typically, the loading process is performed by the prediction module 135 or other processor. The loaded program code corresponds to the predicted application's program code and/or the program code for running hardware associated with the predicted application. The percentage of the predicted application that is allowed to complete is related to the amount of time that lapses between the folder selection command and the application selection command.

At step 350, the computing device may receive an application selection command from a user, administrator, algorithm, remote device or the like requesting that an application be opened. The selected application command may indicate what application within the folder has been selected, for example, by a user. The command may be in the same or different form as the folder selection command in step 310. In embodiments, the command may be processed by a processor.

Step 360 may compare the selected application from step 350 with the predicted application that was loaded at step 340. If the selected application is the same as the predicted application then the launcher module 140 launches the already loaded program code that is associated with the predicted application. This is illustrated at step 370.

If the selected application is different from the predicted application, new program code associated with the selected application and/or the program code associated with the selected application's hardware is loaded, for example, by a processor and launched at step 380. The launch may be performed by the launcher module 140; however, the prediction module 135 may perform the launch in embodiments where the launching module 140 is incorporated into the prediction module 135. In embodiments, the prediction module 135 or the launcher module 140 may perform an analysis of the program code that was already loaded for the predicted application and determine what, if any, overlap exists between the already loaded program code and the program code associated with the selected application. If overlap exists, the launcher module 140 may avoid reloading duplicative program code, thereby making the selected application launch faster. Other optimization algorithms may be used to accomplish this end.

At step 390, the prediction module 135 may be informed of what application was selected at step 350. This may allow the prediction module 135 to readjust how much weight should be given to the inputs 110, 115, 120, and 125, modify internal algorithms, and adjust processes so the likelihood of predicting the correct application in the future is increased. In some embodiments, the prediction module 135 may also adjust what inputs it accepts, or give null values to certain inputs, based on what application was selected. These adjustments and modifications may be performed, for example, by the prediction module 135, the user, or an administrator. In embodiments, non-identifiable and/or non-personal information from multiple computing devices may be aggregated, analyzed, and sent back to the computing devices so the prediction module 135 will have a larger data pool from which to draw.

2. Exemplary Environment(s)

Figure 4:
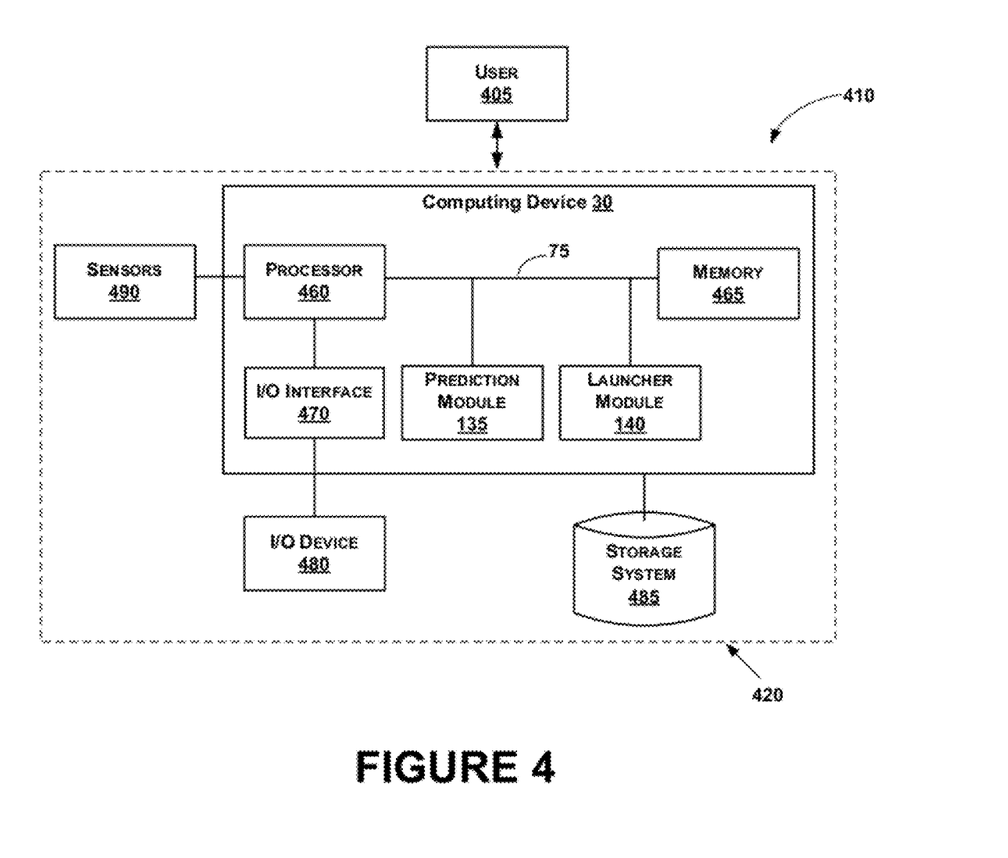
FIG. 4 is an exemplary schematic drawing of a computing environment in accordance with one embodiment.

FIG. 4 shows an illustrative environment 410 configured to manage the processes in accordance with some embodiments. The environment 410 may include a computer infrastructure 420 that may perform the processes described herein. In particular, the computer infrastructure 420 may include a computing device 430 that comprises a prediction module 135 and a launcher module 140.

The prediction module 135 may be configured to predict which application within a selected folder is likely to be selected for launch. The prediction module 135 may be further configured to initialize the transfer of program code associated with the predicted application from the storage system 485 to the active memory 465 in response to receiving the command to open a selected folder. The initiation may be via, for example, a control message. The prediction module 135 may be embodied as software, hardware, or a combination thereof.

The launcher module 140 is capable of receiving a command to launch a selected application and also launching software and/or hardware program code associated with the selected application. In embodiments, the launcher module 140 may be integrated with the prediction module 135. Similar to the prediction module 135, the launcher module 140 may be embodied as software, hardware, or a combination thereof.

The computing device 430 may also include a processor 460, a memory 465, an I/O interface 470, and a communication link 475 (e.g., a wired or wireless connection such as a communication channel or computer bus). The memory 465 may include local memory employed during actual execution of program code, bulk storage, and cache memories which provide temporary storage of at least some program code in order to reduce the number of times code must be retrieved from bulk storage during execution.

The computing device 430 may be in further communication with the external I/O device 480 and the storage system 485. For example, the I/O device 480 may comprise any device that enables a user 405 to interact with the computing device 430 or any device that enables the computing device 430 to communicate with one or more other computing devices using any type of communications link. The external I/O device 480 may be keyboards, displays, pointing devices, microphones, headsets, etc.

In embodiments, one or more sensors 490 may be configured to interact with the computing device 430 to sense external or internal environmental stimuli. One or more of these sensors may be combined with an I/O device 480 or exist separately therefrom. Exemplary sensors may include any of GPS receivers, biometric sensors, infrared sensors, optical sensors, biosensors, Radio Frequency identification (RFID) systems, wireless sensors, smoke sensors, radio sensors, microphones, speakers, gyroscopes, accelerometers, cameras, radars, capacitive sensors, touch sensors, compasses, etc.

In general, the processor 460 may execute computer program code, which may be stored in the memory 465 and/or storage system 485. The computer code may be representable of the functionality of the prediction module 135 and the launcher module 140. In particular, the program code may be for running the predicted application's program code and/or hardware associated with a predicted application. While executing computer program code, the processor 460 may read and/or write data to/from memory 465, storage system 485, and/or I/O interface 470. The program code may execute the processes of the described embodiments. The communications link 475 may provide a communications link between each of the components in the computing device 430.

Figure 5:
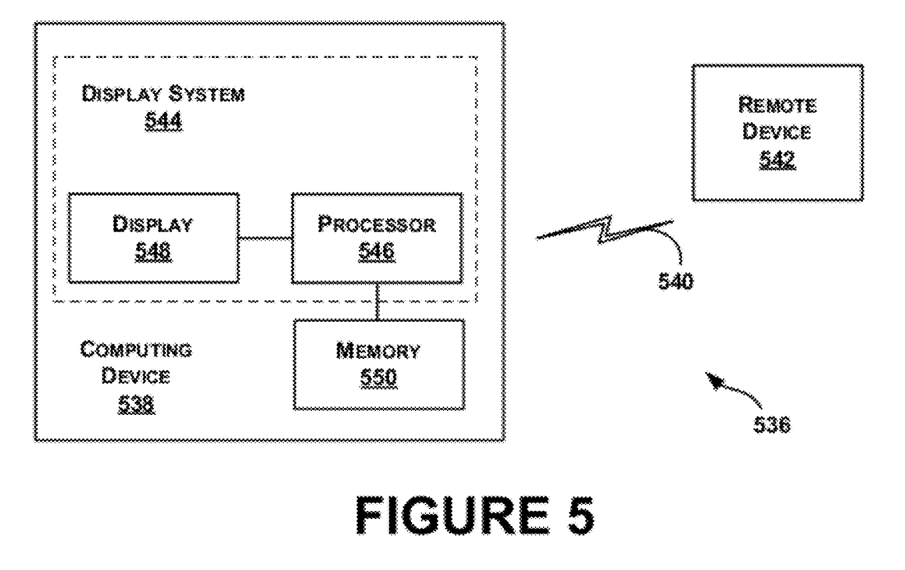
FIG. 5 is an exemplary schematic drawing of a computer network infrastructure in accordance with one embodiment.

It should be understood that the computing infrastructure 420 is only illustrative of various types of computer infrastructures for implementing the described embodiments. For example, FIG. 5 is an exemplary schematic drawing of a computer network infrastructure that may be used instead of or in addition to computing infrastructure 420. The computer network infrastructure in FIG. 5 may include a system 536 having a computing device 538 that communicates using a communication link 540 to a remote device 542. The computing device 538 may be any type of device that may receive data and display information corresponding to or associated with the data. For example, the computing device 538 may be a heads-up display system, such as the eyeglasses 602 described with reference to FIGS. 6 and 7.

Thus, the computing device 538 may include a display system 544 comprising a processor 546 and a display 548. The display 548 may be, for example, an optical see-through display, an optical see-around display, or a video see-through display. The processor 546 may receive data from the remote device 542, and configure the data for display on the display 548. The processor 546 may be any type of processor, such as a micro-processor or a digital signal processor, for example.

The computing device 538 may further include on-board data storage, such as memory 550 coupled to the processor 546. The memory 550 may store software that may be accessed and executed by the processor 546, for example.

The remote device 542 may be any type of computing device or transmitter including a laptop computer, a mobile telephone, etc., that is configured to transmit data to the computing device 538. The remote device 542 and the computing device 538 may contain hardware to enable the communication link 540, such as processors, transmitters, receivers, antennas, etc.

In FIG. 5, the communication link 540 is illustrated as a wireless connection; however, wired connections may also be used. For example, the communication link 540 may be a wired link via a serial bus such as a universal serial bus or a parallel bus. A wired connection may be a proprietary connection as well. The communication link 540 may also be a wireless connection using, for example, Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 542 may be accessible via the Internet and may comprise a computing cluster associated with a particular web service (e.g., social-networking, photo sharing, address book, etc.).

Figure 6:
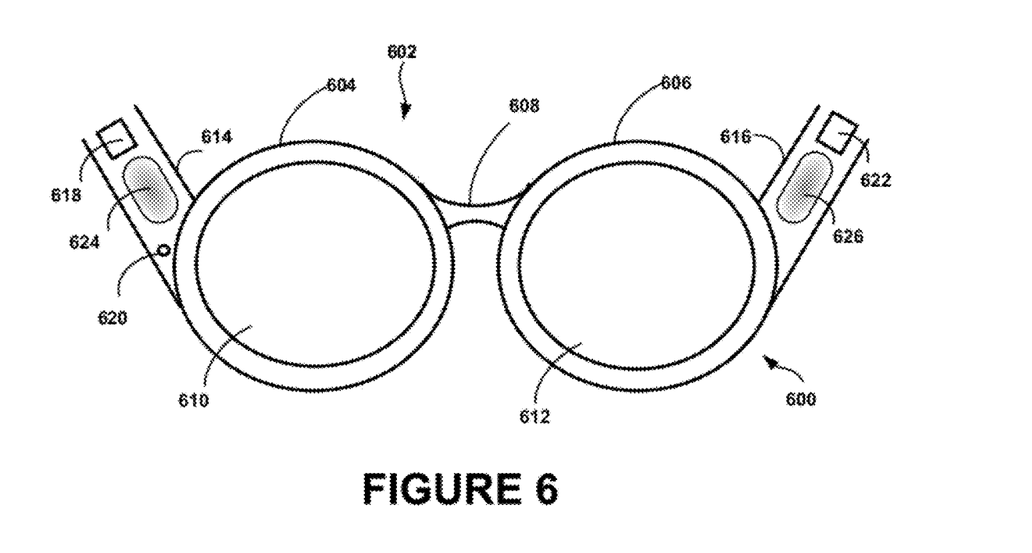
FIG. 6 is an exemplary system for receiving, transmitting, and displaying data according to one embodiment.

FIG. 6 illustrates an exemplary system 600 for receiving, transmitting, and displaying data according to some embodiments. The exemplary system may be implemented using the computing infrastructure 420 of FIG. 4, the computer network infrastructure of FIG. 5, or any similar environment. The system 600 is shown in the form of a wearable computing device. While FIG. 6 illustrates eyeglasses 602 as an example of a wearable computing device, other types of wearable computing devices could additionally or alternatively be used. As illustrated in FIG. 6, the eyeglasses 602 comprise frame elements including lens-frames 604 and 606 and a center frame support 608, lens elements 610 and 612, and extending side-arms 614 and 616. The center frame support 608 and the extending side-arms 614 and 616 are configured to secure the eyeglasses 602 to a user's face via a user's nose and ears, respectively. Each of the frame elements 604, 606, and 608 and the extending side-arms 614 and 616 may be formed of a solid structure of plastic and/or metal, or may be formed of a hollow structure of similar material so as to allow wiring and component interconnects to be internally routed through the eyeglasses 602. Each of the lens elements 610 and 612 may be formed of any material that may suitably display a projected image or graphic. Each of the lens elements 610 and 612 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 614 and 616 are each projections that extend away from the frame elements 604 and 606, respectively, and are positioned behind a user's ears to secure the eyeglasses 602 to the user. The extending side-arms 614 and 616 may further secure the eyeglasses 602 to the user by extending around a rear portion of the user's head. Additionally or alternatively, for example, the system 600 may connect to or be affixed within a head-mounted helmet structure. Other possibilities exist as well.

The system 600 may also include an on-board computing system 618, a video camera 620, a sensor 622, and finger-operable touch pads 624, 626. The on-board computing system 618 is shown to be positioned on the extending side-arm 614 of the eyeglasses 602; however, the on-board computing system 618 may be provided on other parts of the eyeglasses 602 or even remote from the glasses (e.g., computing system 618 could be connected wirelessly or wired to eyeglasses 602). The on-board computing system 618 may include a processor and memory, for example. The on-board computing system 618 may be configured to receive and analyze data from the video camera 620 and the finger-operable touch pads 624, 626 (and possibly from other sensory devices, user interfaces, or both) and generate images for output from the lens elements 610 and 612.

The video camera 620 is shown to be positioned on the extending side-arm 614 of the eyeglasses 602; however, the video camera 620 may be provided on other parts of the eyeglasses 602. The video camera 620 may be configured to capture images at various resolutions or at different frame rates. Many video cameras with a small form-factor, such as those used in cell phones or webcams, for example, may be incorporated into an example of the system 600. Although FIG. 6 illustrates one video camera 620, more video cameras may be used, and each may be configured to capture the same view, or to capture different views. For example, the video camera 620 may be forward facing to capture at least a portion of the real-world view perceived by the user. This forward facing image captured by the video camera 620 may then be used to generate an augmented reality where computer generated images appear to interact with the real-world view perceived by the user.

The sensor 622 is shown mounted on the extending side-arm 616 of the eyeglasses 602; however, the sensor 622 may be provided on other parts of the eyeglasses 602. The sensor 622 may include one or more of a gyroscope or an accelerometer, for example. Other sensing devices may be included within the sensor 622 or other sensing functions may be performed by the sensor 622.

The finger-operable touch pads 624, 626 are shown mounted on the extending side-arms 614, 616 of the eyeglasses 602. Each of finger-operable touch pads 624, 626 may be used by a user to input commands. The finger-operable touch pads 624, 626 may sense at least one of a position and a movement of a finger via capacitive sensing, resistance sensing, or a surface acoustic wave process, among other possibilities. The finger-operable touch pads 624, 626 may be capable of sensing finger movement in a direction parallel or planar to the pad surface, in a direction normal to the pad surface, or both, and may also be capable of sensing a level of pressure applied. The finger-operable touch pads 624, 626 may be formed of one or more translucent or transparent insulating layers and one or more translucent or transparent conducting layers. Edges of the finger-operable touch pads 624, 626 may be formed to have a raised, indented, or roughened surface, so as to provide tactile feedback to a user when the user's finger reaches the edge of the finger-operable touch pads 624, 626. Each of the finger-operable touch pads 624, 626 may be operated independently, and may provide a different function.

Figure 7:
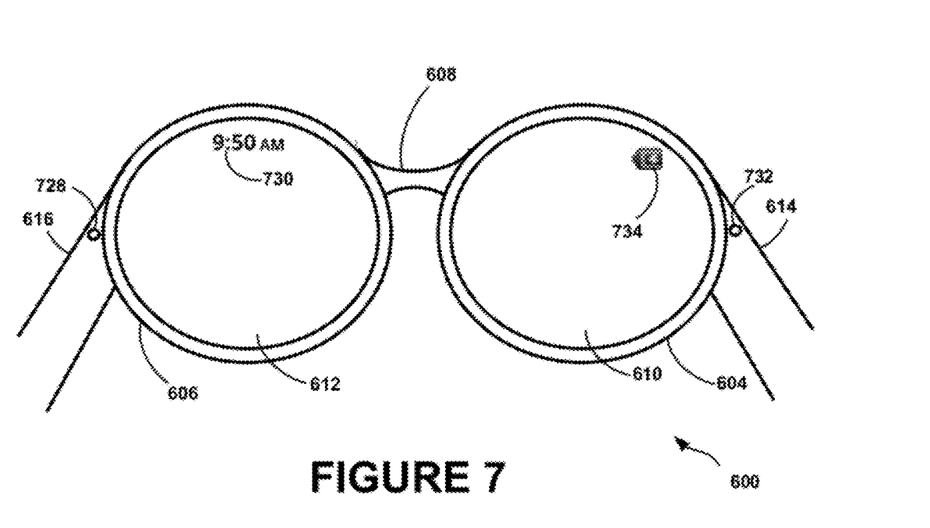
FIG. 7 illustrates an alternate view of the system of FIG. 6.

FIG. 7 illustrates an alternate view of the system 600 of FIG. 6. As shown in FIG. 7, the lens elements 610 and 612 may act as display elements. The eyeglasses 602 may include a first projector 728 coupled to an inside surface of the extending side-arm 616 and configured to project a display 730 onto an inside surface of the lens element 612. Additionally or alternatively, a second projector 732 may be coupled to an inside surface of the extending side-arm 614 and configured to project a display 734 onto an inside surface of the lens element 610.

The lens elements 610 and 612 may act as a combiner in a light projection system and may include a coating that reflects the light projected onto them from the projectors 728 and 732. In some embodiments, a special coating may not be used (e.g., when the projectors 728 and 732 are scanning laser devices).

In alternative embodiments, other types of display elements may also be used. For example, the lens elements 610, 612 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 604 and 606 for driving such a matrix display. Alternatively or additionally, a laser or LED source and scanning system could be used to draw a raster display directly onto the retina of one or more of the user's eyes. Other possibilities exist as well.

The detailed description has made reference to numerous figures. Similar symbols in the figures typically identify similar components, unless context dictates otherwise. The illustrative embodiments described in the detailed description, figures, and claims are not meant to be limiting. Other embodiments may be utilized and other changes may be made without departing from the scope of the subject matter. It should be readily understood that components of the embodiments, as generally described herein, and illustrated in the figures, may be arranged, substituted, combined, separated, and designed in a wide variety of different configurations, all of which are explicitly contemplated.

The described embodiments may be embodied as a system, method or computing device. Accordingly, the described embodiments may take the form of an entirely hardware embodiment, an entirely software embodiment (including firmware, resident software, micro-code, etc.) or an embodiment combining software and hardware aspects that may all generally be referred to herein as a "circuit," "module" or "system."

Any of the methods described herein may be provided in a form of instructions stored on a computer readable medium that, when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

In the context of this document, a computer-usable or computer-readable medium may be any medium that may contain, store, communicate, propagate, or transport the program for use by or in connection with the instruction execution system, apparatus, or device. Embodiments may utilize one or more computer-readable mediums alone or in combination with one another. Exemplary computer readable mediums may include non-transitory computer readable medium, such as computer-readable media that stores data for short periods of time like register memory, processor cache and Random Access Memory (RAM). The computer readable media may also be a non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable media may be considered a computer readable storage media, for example, or a tangible storage media. The computer-readable media could even be paper or another suitable medium upon which the program is printed, as the program may be electronically captured, via, for instance, optical scanning of the paper or other medium, then compiled, interpreted, or otherwise processed in a suitable manner, if necessary, and then stored in a computer memory.

Computer program code for carrying out operations of the described embodiments may be transmitted using any appropriate transmission media via a network. The program code may be written in any combination of one or more programming languages, including but not limited to low-level, scripting, object oriented, logical, or procedural programming languages. The program code may execute entirely on the user's computing device, partly on the user's computing device, as a stand-alone software package, partly on the user's computing device and partly on a remote computing device or entirely on the remote computing device or server. In the latter scenario, the remote computing device may be connected to the user's computing device through any type of network. This may include, for example, a local area network (LAN) or a wide area network (WAN), or the connection may be made to an external computing device (for example, through the Internet using an Internet Service Provider).

Circuitry may also be provided that is wired to perform logical functions in any processes or methods described herein. Any type of device may be used or configured to perform logical functions in any processes or methods described herein. Moreover, any type of device may be used or configured as a means for performing functions of any of the methods described herein (or any portions of the methods described herein).

While multiple embodiments have been described, the various aspects and embodiments disclosed herein are for purposes of illustration and are not intended to be limiting. The true scope of the embodiments may be indicated by the following claims, along with the full scope of equivalents to which the claims are entitled. It is also to be understood that the terminology used herein is for the purpose of describing particular embodiments only, and is not intended to be limiting. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence of additional of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. As such, other arrangements and other elements (e.g., machines, interfaces, functions, orders, and groupings of functions, etc.) may be used instead, and some elements may be omitted altogether according to the desired results. Further, elements that are described as functional entities may be implemented as discrete or distributed components or in conjunction with other components, in any suitable combination and location.

It should be understood that the descriptions herein were chosen to best explain the principles and practical applications of the described embodiments, and to enable others to understand the embodiments with various modifications as are suited to the particular use contemplated. Accordingly, while numerous embodiments have been described, it should be understood that the embodiments may be practiced with modifications, variations, and changes in detail and in the spirit and scope of the appended claims.

What is claimed is:

1. A computer-implemented method comprising:
    maintaining a plurality of folders, wherein individual folders include one or more applications;
    receiving a command to open a selected folder of the plurality of folders;
    predicting which application included in the selected folder will be selected for launching and loading program code associated with the predicted application into active memory in response to receiving the command to open the selected folder, wherein predicting which application included in the selected folder will be selected for launching comprises considering data received from (i) a Global Positioning System (GPS) sensor when the command to open the selected folder is received and (ii) a microphone when the command to open the selected folder is received;
    receiving a command to launch a selected application included in the selected folder; and
    launching the selected application in response to receiving the command to launch the selected application.

2. The computer-implemented method of claim 1, wherein the predicted application is the same as the selected application.

3. The computer-implemented method of claim 1, wherein the predicted application is different than the selected application.

4. The computer-implemented method of claim 1, wherein the program code associated with the predicted application corresponds to program code for running hardware associated with the predicted application.

5. The computer-implemented method of claim 1, wherein the program code associated with the predicted application corresponds to the predicted application's program code.

6. The computer-implemented method of claim 1, wherein predicting which application included in the selected folder will be selected for launching further comprises considering a history of applications included in the selected folder that have been selected for launch in the past.

7. The computer-implemented method of claim 1, wherein predicting which application included in the selected folder will be selected for launching further comprises considering a history of applications that have been launched within a predefined time period from the time that the command to open the selected folder is received.

8. The computer-implemented method of claim 1, wherein predicting which application included in the selected folder will be selected for launching further comprises considering a day and time that the command to open the selected folder is received.

9. The computer-implemented method of claim 1, wherein predicting which application included in the selected folder will be selected for launching further comprises considering data received from a light sensor when the command to open the selected folder is received.

10. The computer-implemented method of claim 1, wherein predicting which application included in the selected folder will be selected for launching further comprises considering data received from an accelerometer when the command to open the selected folder is received.

11. The computer-implemented method of claim 1, wherein predicting which application included in the selected folder will be selected for launching further comprises considering data received from a biometric sensor when the command to open the selected folder is received.

12. The computer-implemented method of claim 11, wherein the biometric sensor is configured to measure one at least one of a pulse, a temperature, and an eye movement.

13. A computing device comprising:
a display device configured to display a graphical user interface comprising a plurality of folders, wherein individual folders include one or more applications;
non-transitory computer-readable media comprising active memory configured to store program code associated with one or more active applications and storage memory configured to store program code associated with one or more inactive applications;
a user interface configured to receive a command to open a folder of the plurality of folders; and
a prediction module configured to predict which application included in the selected folder will be selected for launching and to initiate the transfer of program code associated with the predicted application from the storage memory to the active memory in response to receiving the command to open the selected folder, wherein the prediction module is configured to predict which application included in the selected folder will be selected for launching based on at least (i) a day and time that the command to open the selected folder is received and (ii) data received from a Global Positioning System (GPS) sensor when the command to open the selected folder is received.

14. The computing device of claim 13, wherein the user interface is further configured to receive a command to launch a selected application included in the selected folder, and wherein the computing device further comprises a launcher module configured to launch the selected application in response to receiving the command to launch the selected application.

15. The computing device of claim 13, wherein the program code associated with the predicted application corresponds to one or more of (i) program code for running hardware associated with the predicted application and (ii) program code associated with the predicted application corresponds to the predicted application's program code.

16. The computing device of claim 13, wherein the prediction module is further configured to predict which application included in the selected folder will be selected for launching based on at least one of (i) a history of applications included in the selected folder that have been selected for launch in the past and (ii) a history of applications that have been launched within a predefined time period from the time that the command to open the selected folder is received.

17. The computing device of claim 13, wherein the prediction module is further configured to predict which application included in the selected folder will be selected for launching based on at least one of (i) data received from a light sensor when the command to open the selected folder is received, (ii) data received from a microphone when the command to open the selected folder is received, (iii) data received from an accelerometer when the command to open the selected folder is received, and (iv) data received from a biometric sensor when the command to open the selected folder is received.

18. The computing device of claim 13, wherein the computing device is a wearable computing device.

* * * * *